United States Patent [19]

Demers

[11] Patent Number: 4,806,848
[45] Date of Patent: Feb. 21, 1989

[54] COMPRESSOR BLADE CLEARANCE MEASUREMENT SYSTEM

[75] Inventor: Rosario N. Demers, Dayton, Ohio

[73] Assignee: The United States of America as represented by the Secretary of the Air Force, Washington, D.C.

[21] Appl. No.: 24,490

[22] Filed: Mar. 11, 1987

[51] Int. Cl.$^4$ .............................................. G01B 7/14
[52] U.S. Cl. ............................ 324/61 R; 324/57 Q; 340/870.37
[58] Field of Search ................. 324/61 P, 61 R, 57 Q, 324/57 R; 340/870.37

[56] References Cited

U.S. PATENT DOCUMENTS

| | | | |
|---|---|---|---|
| 3,504,279 | 3/1970 | Foster et al. ........................... | 324/61 |
| 3,631,336 | 12/1971 | Marvin ................................ | 324/57 Q |
| 3,862,571 | 1/1975 | Vogel .................................... | 324/61 P |
| 3,944,792 | 3/1976 | Sautner ................................ | 324/61 P |
| 4,086,528 | 4/1978 | Walton ................................. | 324/61 R |
| 4,347,741 | 9/1982 | Geiger .................................. | 324/61 P |
| 4,350,040 | 9/1982 | Fasching ............................. | 324/61 P |
| 4,499,640 | 2/1985 | Brenton ............................... | 324/61 P |
| 4,654,598 | 3/1987 | Arulanandan ...................... | 324/61 P |

FOREIGN PATENT DOCUMENTS

| | | | |
|---|---|---|---|
| 1249290 | 9/1967 | Fed. Rep. of Germany .... | 324/61 R |
| 1957361 | 6/1970 | Fed. Rep. of Germany .... | 324/61 P |
| 667800 | 6/1979 | U.S.S.R. . | |
| 2071852 | 9/1981 | United Kingdom .............. | 324/61 P |

OTHER PUBLICATIONS

C. R. Amsbury and J. W. H. Chivers, "Systems for the Measurement of Rotor Tip Clearance and Displacement in a Gas Turbine", in AGARD Seal Technol in Gas Turbine Eng., Aug. 1978.

Primary Examiner—Reinhard J. Eisenzopf
Assistant Examiner—Jose M. Solis
Attorney, Agent, or Firm—Bernard E. Franz; Donald J. Singer

[57] ABSTRACT

The system is used to measure the gap between the turbine engine compressor blade tip and the compressor case. The measurement is accomplished while the engine is running. This system has several unique features which minimize problems plaguing earlier systems. These include tuning stability and sensitivity drift. Both these problems are intensified by the environmental factors present on compressors, i.e., wide temperature fluctuations, vibrations, conductive contamination of probe tips and others. The circuitry in this new system provides phase lock feedback to control tuning and shunt calibration to measure sensitivity. The use of high frequency excitation lowers the probe tip impedance, thus minimizing the effects of contamination. The ability to control tuning and to calibrate has been demonstrated.

9 Claims, 12 Drawing Sheets

Fig. 2B $C = C_T + \Delta C$ $C_T$ = TOTAL SYSTEM STEADY STATE CAPACITANCE $\Delta C$ = BLADE TO PROBE CAPACITANCE

SERIES RLC CIRCUIT CONFIGURATION $$\frac{V_o}{V_i} = \frac{R_2}{R_L + R_2(1-\omega^2 LC) + j\omega(R_L R_2 C + L)}$$

$$\phi_{1,2} = -\tan^{-1}\left[\frac{\omega(R_L R_2 C + L)}{R_L + R_2(1-\omega^2 LC)}\right]$$

$$U = \frac{\omega(R_L R_2 C + L)}{R_L + R_2(1-\omega^2 LC)}$$

$$\frac{d\phi_{1,2}}{dC} = \frac{-U^2}{U^2+1}\left[\frac{\omega R_L^2 R_2 + \omega R_L R_2^2 + \omega^3 R_2 L^2}{\omega^2 R_L^2 R_2^2 C^2 + 2\omega^2 R_L R_2 LC + \omega^2 L^2}\right]$$

Fig. 3B — EFFECT OF PERTURBATING C IN THE SERIES RLC CIRCUIT CONFIGURATION

EFFECT OF PERTURBATING C IN THE PARALLEL RLC CIRCUIT CONFIGURATION

For $R_2 \gg R_1 \gg \omega L \gg R_L$

Then $U \approx 0$ $$\frac{d\phi_{1,2}}{dC} \approx \frac{-\omega^3 L^2 R_1}{\omega^2 L^2 + R_1 R_L}$$

EFFECT OF CLOSE BLADE SPACING ON SIGNAL

TRIAXIAL PROBE WITH DRIVEN GUARD

Fig. 12

COMPRESSOR BLADE CLEARANCE MEASUREMENT SYSTEM

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a compressor blade clearance measurement system, and more particularly to a system for use in jet engine test facilities for clearance measurement between rotating blades and case.

Measurement of blade-case clearance on an operating jet engine has always been a difficult task to accomplish accurately. Accuracy, stability and reliability under the harsh conditions imposed by an operating engine have been less than desirable on past systems. The need for this data becomes more important as the requirement for higher efficiency and performance are sought.

U.S. Pat. No. 3,504,279 discloses a system for the noncontact inspection of a rotating interrupted surface which includes pickup sensitive to distince dependent energy variation signal processing circuitry and display means to provide a visual analog of the profile of the surface under inspection. U.S. Pat. No. 4,086,528 discloses a measuring apparatus for determining a linear quantity which includes a capacitance transducer. Soviet Union Pat. No. 667,800 discloses an apparatus for measuring the dynamic radial gap in rotating electrical machines and turbines using a capacitive transducer. West German Pat. No. 1,249,290 discloses a test rig for turbine blades to check that none is missing, which includes an electrode in the turbine housing close to the rotating blade wheel rim to produce a modulated signal as each blade passes.

SUMMARY OF THE INVENTION

An object of the invention is to provide a clearance measurement system which solves many of the drift and accuracy problems of earlier systems.

The invention is directed to a compressor blade clearance measurement system used to measure the gap between the turbine engine compressor blade tip and the compressor case. This measurement is accomplished while the engine is running. The subject invention uses a capacitor sensor and a 10 MHz tuned circuit in which the blade to sensor capacitance changes the circuit phase response. It is this phase change which is detected and processed. The circuit can be configured in either series or parallel resonance. In addition, the component electronics are removed from the probe assembly and are included in the exciter/detector electronics a short distance away from the probe. The probe itself is connected to the exciter/detector via a short low capacitance low noise cable. The 10 MHz excitation frequency provides for a relatively low sensor impedance of 100 to 400 ohms and is high enough to insure adequate response bandwidth.

The features of this invention address two of the most troublesome problems plaguing earlier systems. First, the drift of the instrument is controlled effectively through feedback techniques. Second, the sensitivity of the instrument can be electronically calibrated, even while the machine is operating.

DETAILED DESCRIPTION

Figure 1:
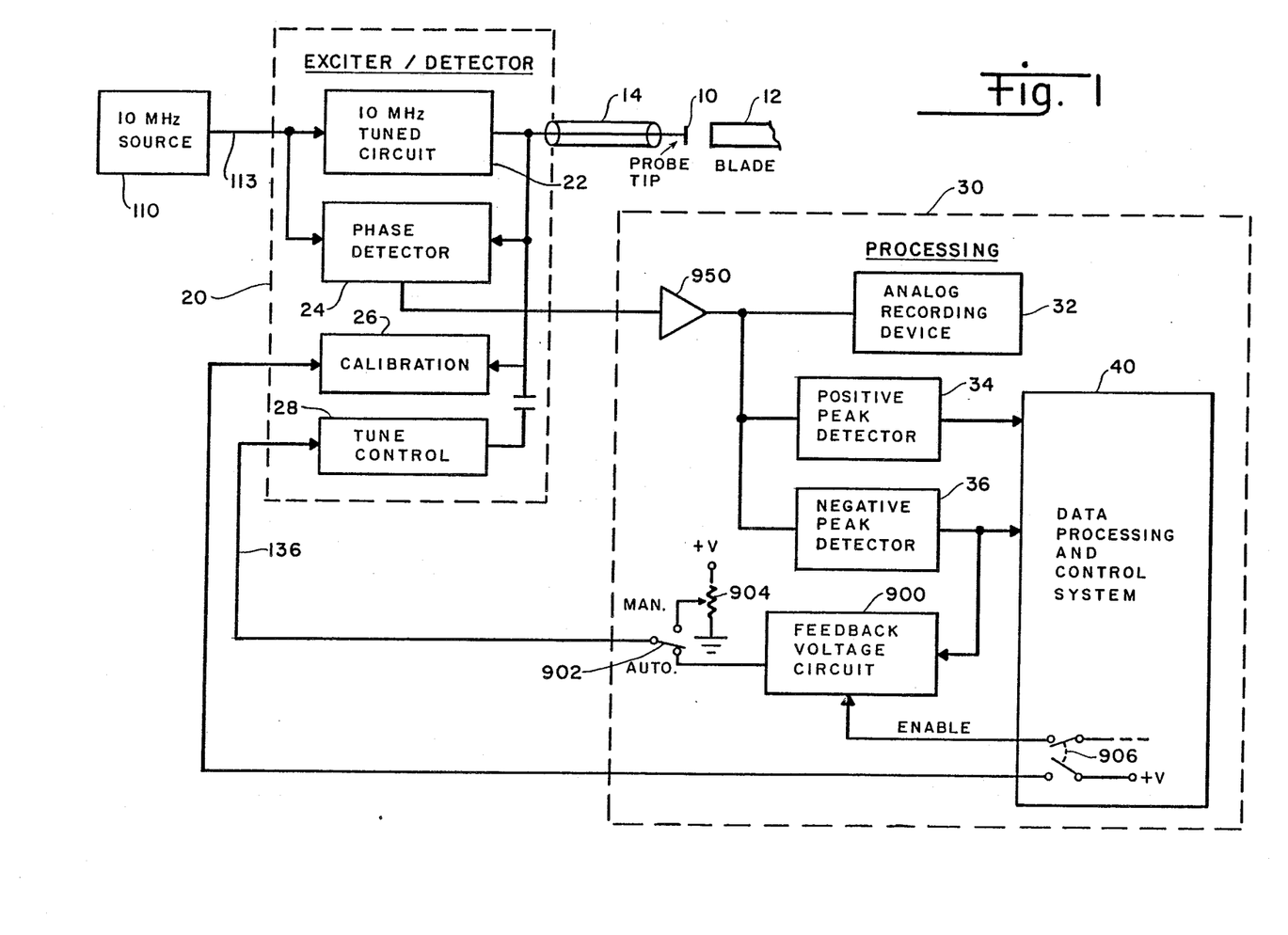
FIG. 1 is a block diagram of a compressor blade clearance measurement system.

FIG. 1 is a diagram of a capacitance clearance measurement system, in which a probe tip 10 is shown adjacent to a turbine blade 12. The probe is connected via a cable 14 to an exciter/detector electronic unit 20, which comprises a 10-MHz tuned circuit 22 and a phase detector 24, along with a calibration circuit 26 and a tune control circuit 28. The system also includes processing apparatus 30 which includes an amplifier 950 coupling the output of the phase detector 24 to an analog recording device (which may be an oscilloscope), a positive peak detector 34, a negative peak detector 36, and a data processing and control system 40 having inputs from the two peak detectors. Also shown is a feedback voltage control circuit 900 for automatic control of the tune control circuit 28, which may be selected by a switch 902 in place of a potentiometer 904 for manual control.

The criteria used to develop the capacitance clearance measurement system was derived in part from experience with a jet engine designated J85. The seventh and eighth stages of this engine's compressor has 140 blades each which are approximately 0.5 mm thick at the tips. At 100% speed the blade passage rate exceeds 37,000 revolutions per second which allows only a 1.8 microsecond exposure to the capacitor sensor. It is this time window which determines the minimum bandwidth necessary. The highest temperature for the eighth stage is approximately 300° C. which although not very high, does present problems to the capacitance clearance measurement system. This problem is due to the effect of the temperature on the dielectric properties of the ceramic used in the construction of the probe. A change in probe temperature causes a change in capacitance and this effect must be accounted for. In addition, the probe tips are exposed to the contaminants such as oil and water which are sometimes ingested into the engine. The contaminants adversely affect the probe sensitivity and calibration by shunting the probe tip with an electrical resistance.

Based on the conditions described above, the following criteria were established for the development of a new capacitive clearance measurement system.

1. Accuracy of 0.025 mm with a 0.5 mm thick airfoil at 0.5 mm distance from sensor using a 3 mm sensing element.
2. Frequency response of 1 MHz.
3. High tolerance to probe contamination (i.e., 10K ohms across the sensing element and ground).
4. Low offset drift under all operating conditions.
5. Useful temperature range to 800° C.
6. On-line sensitivity calibration.
7. Simple probe design.

Keeping in mind the criteria established above, the basic system as shown in FIG. 1 comprises a 10 Mhz tuned circuit 22 in which the blade to sensor capacitance changes the circuit phase response. It is this phase change which is detected and processed. The circuit can be configured in either series or parallel resonance. In addition, the component electronics are removed from the probe assembly and are included in the exciter/detector electronics 20 a short distance away from the probe. The probe itself is connected to the exciter/detector via a short low capacitance low noise cable 14. The advantages of this configuration are many. The probes are simple enough to be designed and built to accommodate any machine and environment. The 10 MHz excitation frequency provides for a relatively low sensor impedance of 100 to 400 ohms and is high enough to insure adequate response bandwidth. The probes can be calibrated at very low speeds, and by utilizing precision variable capacitors with very low temperature coefficients the sensitivity can be calibrated during operation. By using a varacter diode and feedback circuit the base line tuning can be kept constant.

Figure 2A:
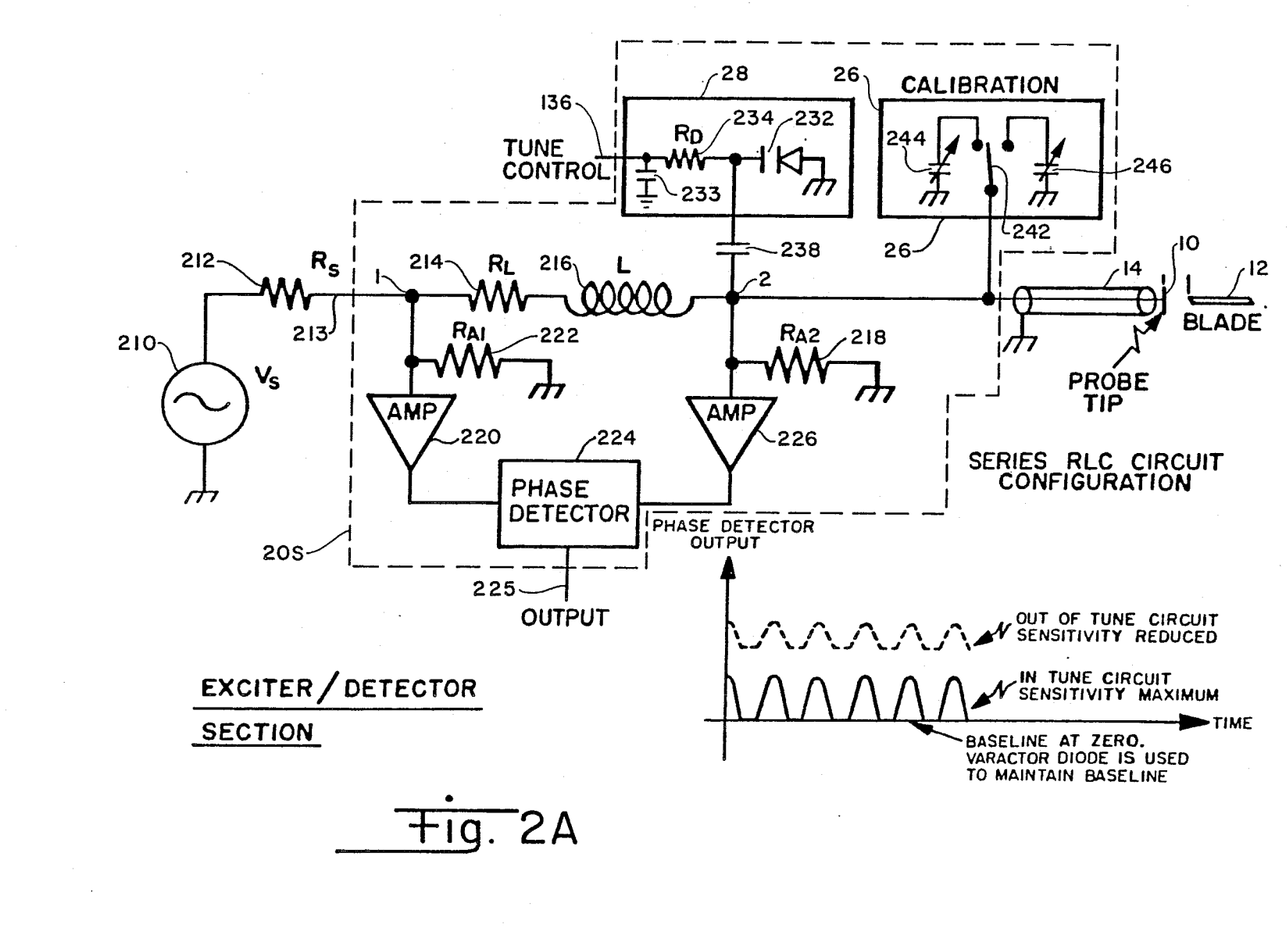
FIG. 2A is a schematic diagram of an exciter/detector module with a series RLC circuit configuration fo the system of FIG. 1.
Figure 2B:
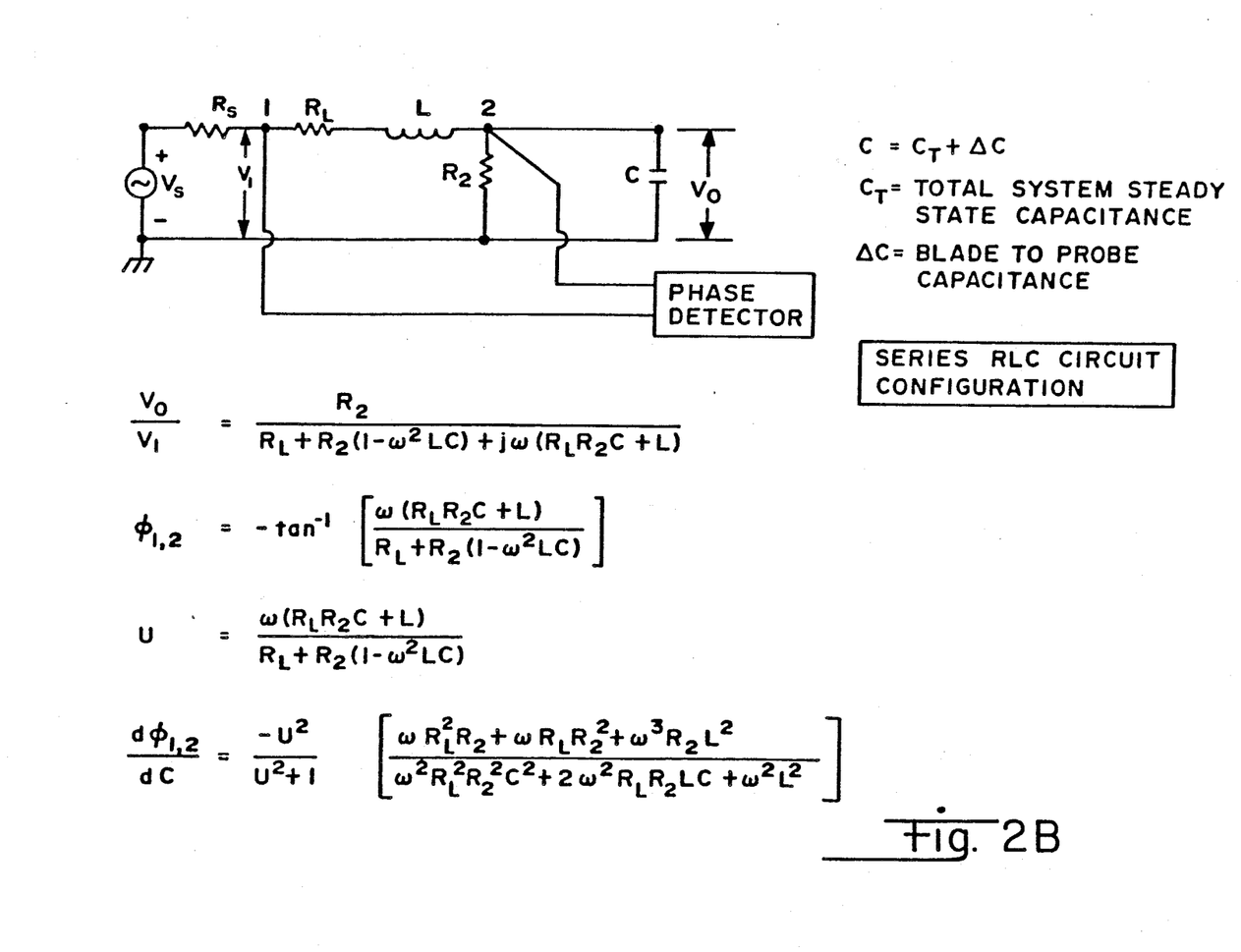
FIG. 2B is an equivalent circuit for analysis of the circuit of FIG. 2A.
Figure 3A:
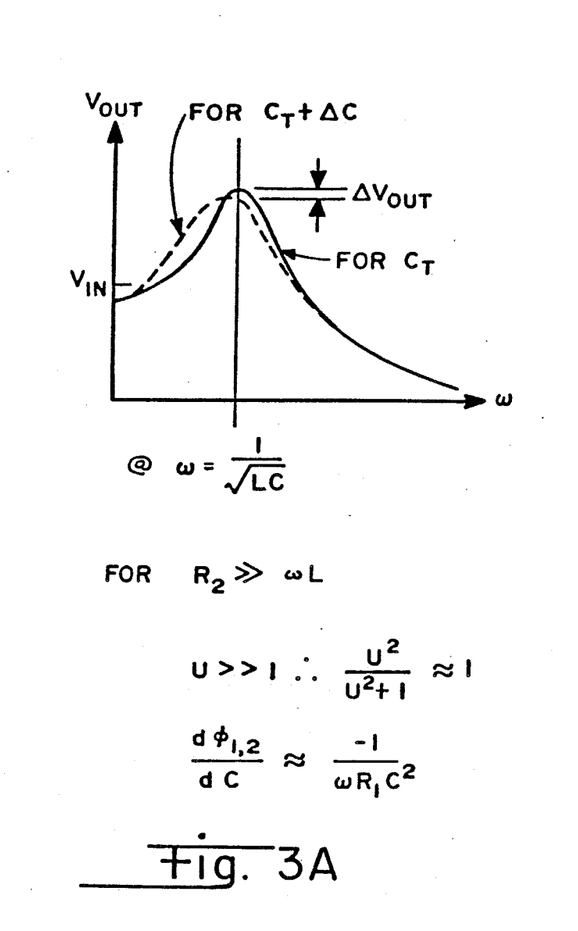
FIGS. 3A, 3B and 4 are graphs relating to the analysis of FIG. 2A.
Figure 3B:
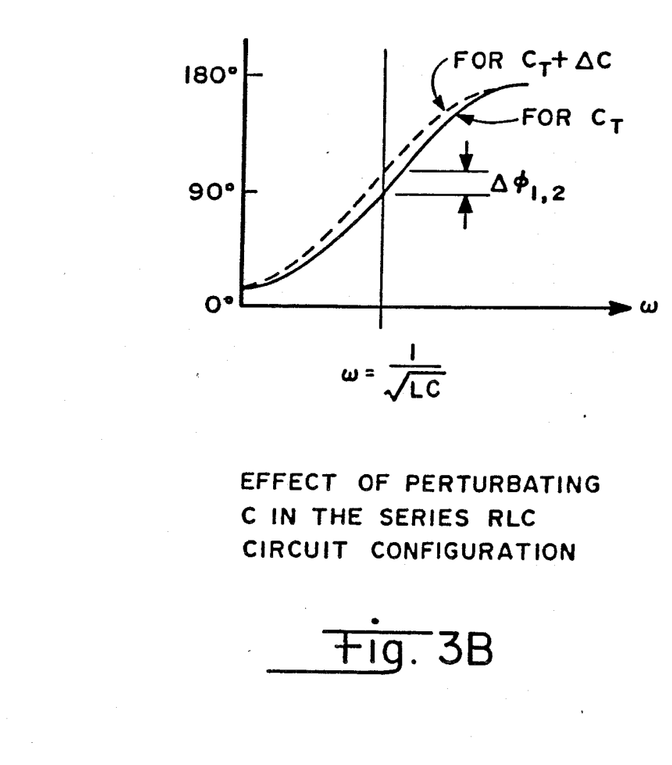

The series configuration as shown in FIG. 2A and its analytical model as shown in FIGS. 2B and 3 is the simplest. The phase shift at resonance is already 90° and further phase shift prior to the phase detector is unnecessary.

The series circuit 20S of FIG. 2 shows an R.F. excitation source 210 having a voltage $V_S$ in series with resistance 212 having a value $R_S$ to an input junction point 1. The 10-MHz circuit comprises a resistance 214 with a value $R_L$ in series with an inductor 216 with a value L to a junction point 2, series capacitance being provided from point 2 by the cable 14 and the probe with its tip 10 adjacent the blade 12. The junction points 1 and 2 are connected via amplifiers 220 and 226 respectively, to the phase detector 224. The points 1 and 2 have shunt resistance to ground represented as resistors 222 and 218 respectively, having values $R_{A1}$ and $R_{A2}$. The tuning control circuit 28 comprises a varacter diode 232 in series with resistance 234 with a value $R_D$ to a tuning control terminal 136 (for connection to an adjustable D.C. voltage), with a filter capacitor 233 from terminal 136 to ground. The varacter diode 232 is coupled via a capacitor 238 to the point 2. The calibration circuit 26 has a switch 242 (relay contacts) for connecting the junction point 2 to either one of two capacitors 244 and 246.

The analytical circuit model of FIG. 2A for the series RLC configuration shows the the voltage source $V_S$ and its series resistance $R_S$ between point 1 and ground providing the input voltage $V_I$, and the values $R_L$ and L between points 1 and 2, as in FIG. 2. The value of the resistance from point 2 to ground is shown as $R_2$, across which appears the output voltage $V_O$. The capacitance from point 2 to ground is $C = C_T + \Delta C$, where $C_T$ is the total system steady state capacitance, and $\Delta C$ is the blade to probe capacitance.

The ratio of output to input voltage, the phase between points 1 and 2, and the rate of change of the phase with respect to the capacitance across the output are as follows:

$$\frac{V_O}{V_I} = \frac{R_2}{R_L + R_2(1 - \omega^2 LC) + j\omega(R_L R_2 C + L)}$$

$$\phi_{1,2} = -\tan^{-1}\left( \frac{\omega(R_L R_2 C + L)}{R_L + R_2(1 - \omega^2 LC)} \right)$$

Let $$U = \frac{\omega(R_L C_2 + L)}{R_L + R_2(1 - \omega^2 LC)}$$

Then $$\frac{d\phi_{1,2}}{dC} = \frac{-U^2}{U^2 + 1}\left( \frac{\omega R_L^2 R_2 + \omega R_L R_2^2 + \omega^3 R_2 L^2}{\omega^2 R_L^2 R_2^2 C^2 + 2\omega^2 R_L R_2 LC + \omega^2 L^2} \right)$$

FIGS. 3A and 3B are graphs showing the effect of perturbing the capacitance C in the series RLC circuit configuration as $\omega$ is varied, with FIG. 3A showing the variation of the output voltage for a given input voltage, and FIG. 3B showing the variation of the phase, where $\omega = 1/\sqrt{LC}$.

for $R_2 >> \omega L$ $$U >> 1 \therefore \frac{U^2}{U^2 + 1} \approx 1$$

$$\frac{d\phi_{1,2}}{dC} \approx \frac{-1}{\omega R_1 C^2}$$

Figure 4:
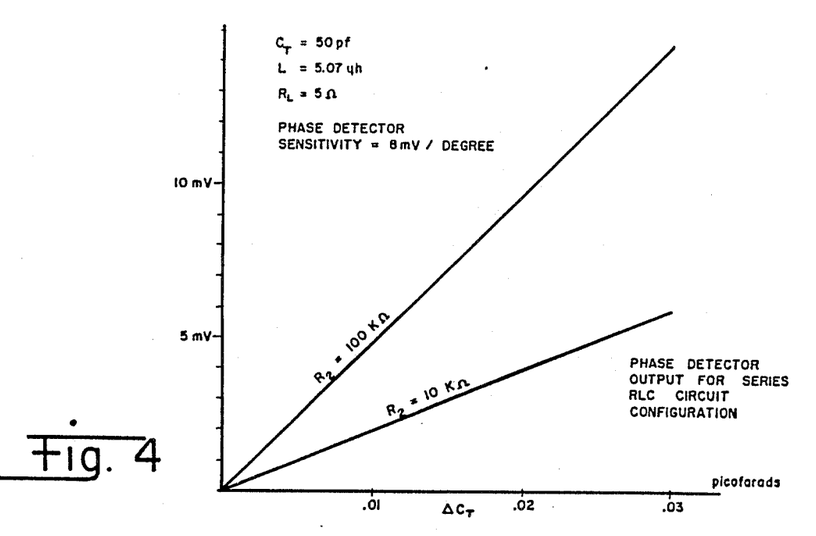

The above sensitivity is shown by graphs in FIG. 4 for the parameters shown. Note the sensitivity is inversely proportional to the frequency, series resistance and the square of the total capacitance. The reduction of total capacitance has the greatest effect on the increase of sensitivity and every effort is made to minimize this parameter. Although it is desirable to obtain a high Q for this circuit, there are practical limitations which must be considered. First, the voltage ratio between point 1 and point 2 should be kept reasonable due to the limitations of the electronics involved (i.e., the voltage at point #2 can cause the amplifier to saturate). Second the effects of contamination of the probe tip would greatly exaggerate the changes in sensitivity. A good compromise has been found through experimentation on a prototype system. In this system, $R_1 = 5$ ohms and $R_2 = 50K$ ohms. FIG. 4 illustrates the effect $R_2$ has on the sensitivity. By changing the shunt resistance from 100K ohm to 10K ohm the sensitivity was reduced by a factor of ⅜. This reduction is unacceptable unless some provisions are made to measure the change in sensitivity. The technique used will be described in a later paragraph.

Figure 5:
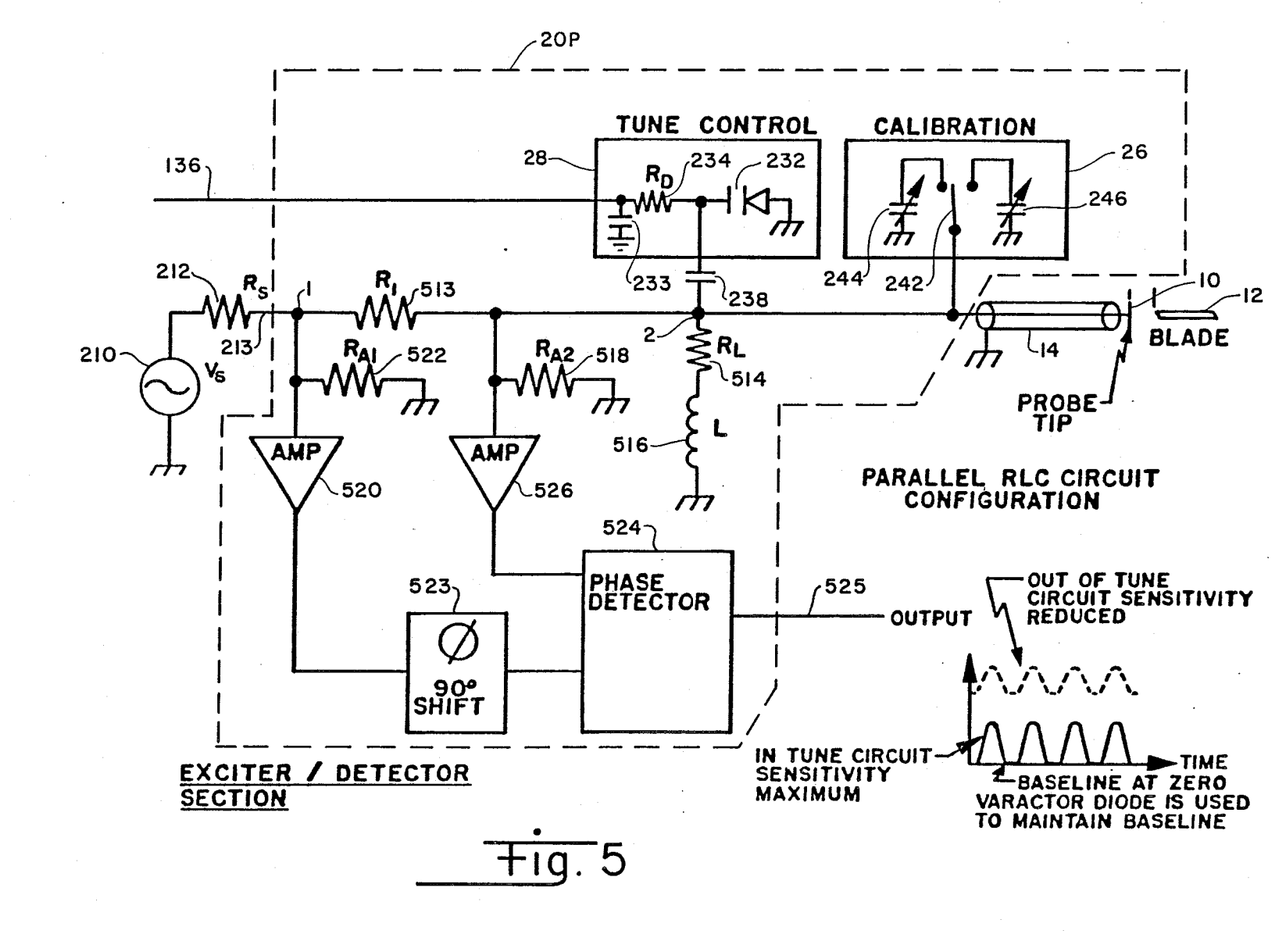
FIG. 5 is a schematic diagram of an exciter/detector module with a parallel RLC circuit configuration for the system of FIG. 1.
Figure 6:
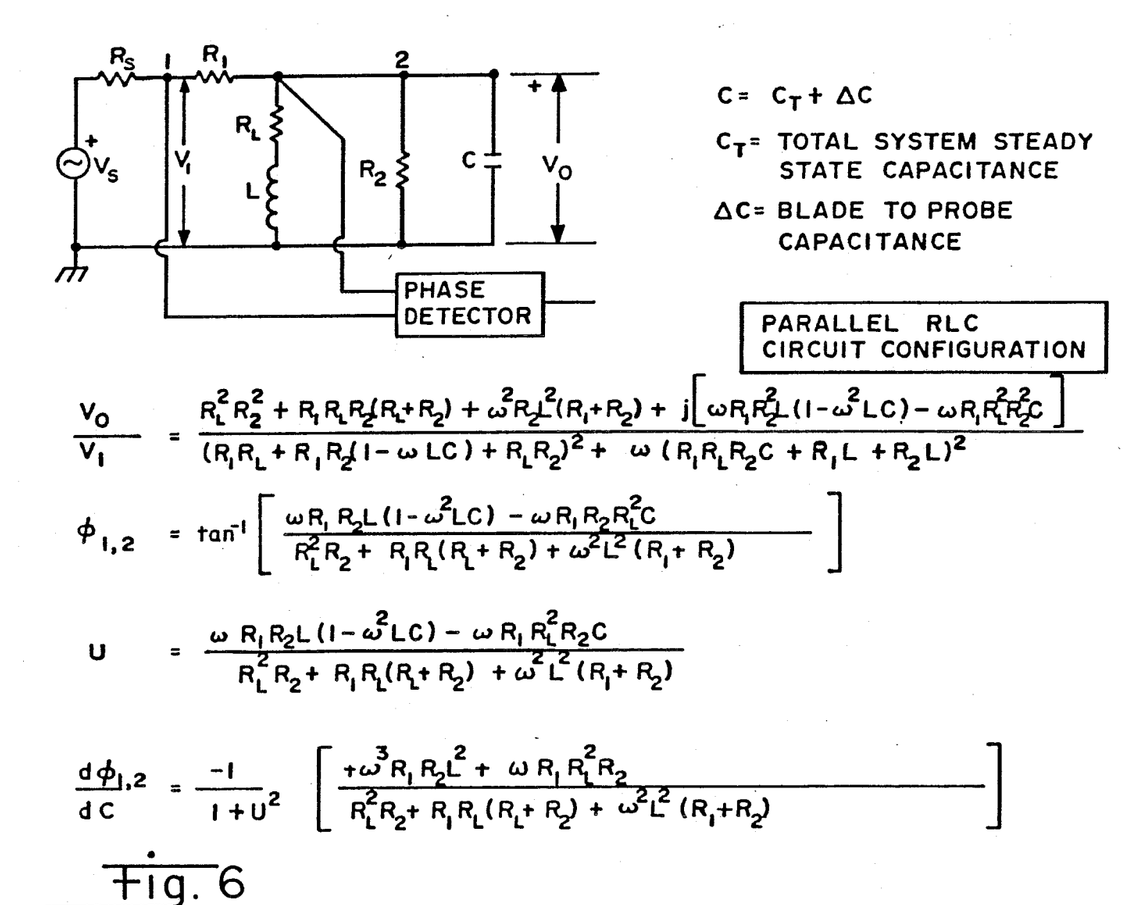
FIG. 6 is an equivalent circuit for analysis of the circuit of FIG. 5.
Figure 7A:
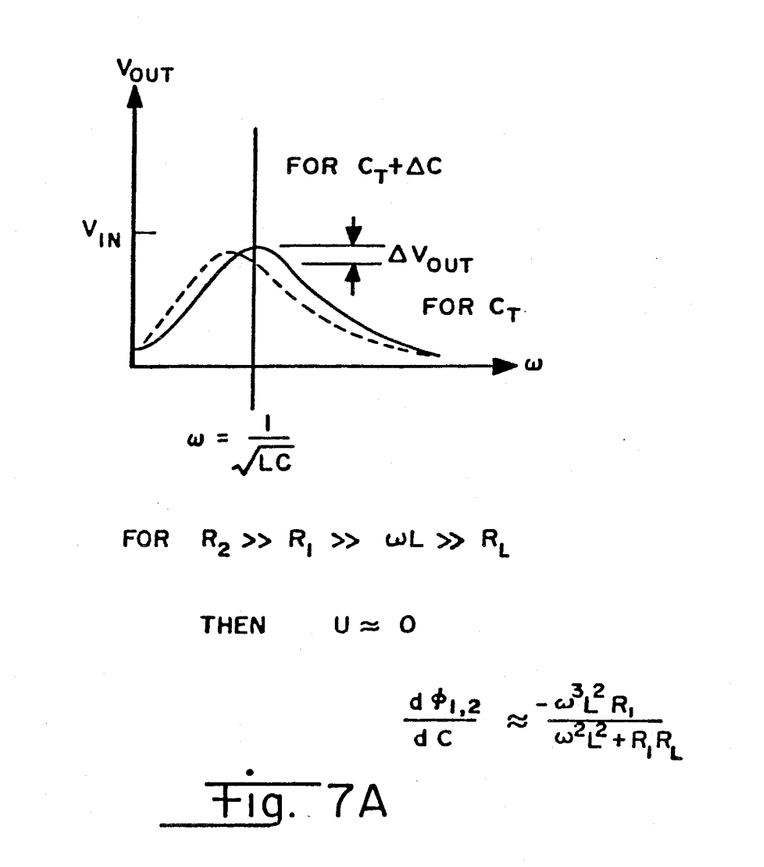
FIGS. 7A, 7B and 8 are graphs relating to the analysis of FIG. 5.
Figure 7B:
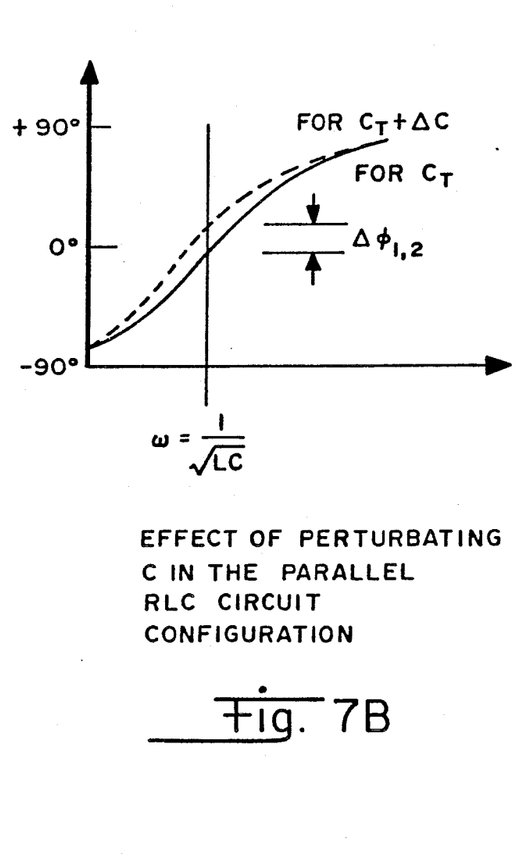
Figure 8:
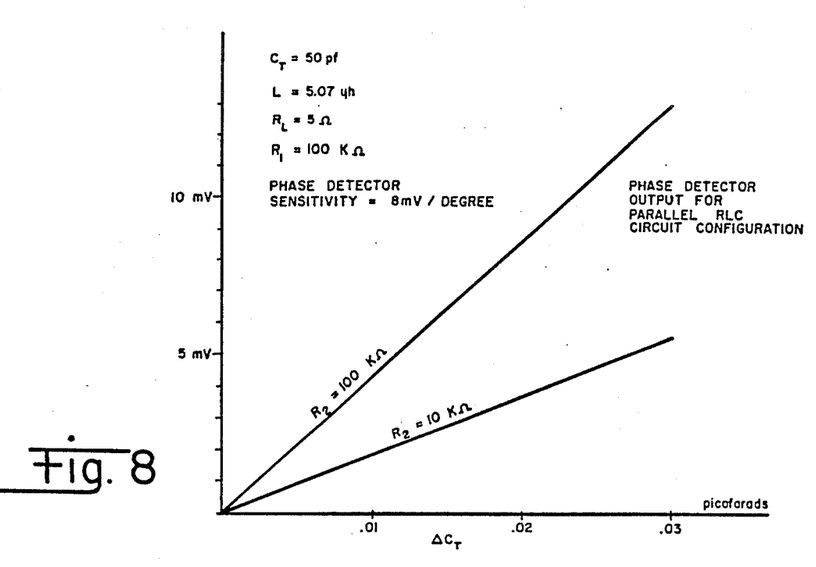

Using the parallel configuration as described in FIGS. 5, 6 and 7 provides similar results to the sensor configuration. The advantage of this circuit is the near unity voltage ratio which reduces the burden on the buffer amplifier. The disadvantage of this configuration is the necessity to establish a 90° phase shift in the reference signal input to the phase detector. The phase shift is created by two R.C. networks which are adjusted to provide 45° of phase shift each. FIG. 8 provides some insight to the effect of shunt resistance on sensitivity.

The parallel circuit 20P of FIG. 5 shows the R.F. excitation source 210 having a voltage $V_S$ in series with resistance 212 having a value $R_S$ to the input junction point 1. A resistor 513 having a value $R_1$ connects point 1 to point 2. The 10-MHz resonance circuit comprises a resistance 514 with a value $R_L$ in series with an inductor 516 with a value L shunted from point 2 to ground, the parallel capacitance C being provided from point 2 by the cable 14 and the probe with its tip 10 adjacent the blade 12. The junction points 1 and 2 are coupled via amplifiers 520 and 526 respectively to the phase detector 224, with a 90° phase shift circuit 523 inserted between the output of amplifier 520 and the phase detector 524. The points 1 and 2 have shunt resistance to ground represented as resistors 522 and 518 respectively having values $R_{A1}$ and $R_{A2}$. As in FIG. 2A point 2 is coupled to the calibration circuit 26 and via the capacitor 238 to the tuning control ciruit 28.

The analytical circuit model of FIG. 6 for the parallel RLC configuration shows the the voltage source $V_S$ and its series resistance $R_S$ between point 1 and ground providing the input voltage $V_I$, and the values $R_L$ and L between point 2 and ground, as in FIG. 5. The value of the resistance from point 2 to ground is shown as $R_2$, across which appears the output voltage $V_O$. The capacitance from point 2 to ground is $C = C_T + \Delta C$, where $C_T$ is the total system steady state capacitance, and $\Delta C$ is the blade to probe capacitance.

The ratio of output to input voltage, the phase between points 1' and 2', and the rate of change of the phase with respect to the capacitance across the output are as follows:

$$\frac{V_O}{V_I} = \frac{R_L^2 R_2^2 + R_1 R_L R_2 (R_L + R_2) + \omega^2 R_2 L^2 (R_1 + R_2) + j[\omega R_1 R_2^2 L (1 - \omega^2 LC) - \omega R_1 R_L^2 R_2^2 C]}{(R_1 R_L + R_1 R_2 (1 - \omega LC) + R_L R_2)^2 + \omega (R_1 R_L R_2 C + R_1 L + R_2 L)^2}$$

$$\phi_{1,2} = -\tan^{-1}\left( \frac{\omega R_1 R_2 L (1 - \omega^2 LC) - \omega R_1 R_2 R_L^2 C}{R_L^2 R_2 + R_1 R_L (R_L + R_2) + \omega^2 L^2 (R_1 + R_2)} \right)$$

Let $$U = \frac{\omega R_1 R_2 L (1 - \omega^2 LC) - \omega R_1 R_2 R_L^2 C}{R_L^2 R_2 + R_1 R_L (R_L + R_2) + \omega^2 L^2 (R_1 + R_2)}$$

Then $$\frac{d\phi_{1,2}}{dC} = \frac{-1}{1+U^2} \left( \frac{+\omega^3 R_1 R_2 L^2 + \omega R_1 R_L^2 R_2}{R_L^2 R_2 + R_1 R_L (R_L + R_2) + \omega^2 L^2 (R_1 + R_2)} \right)$$

FIGS. 7A and 7B are graphs showing the effect of perturbing the capacitance C in the parallel RLC circuit configuration as $\omega$ is varied, with FIG. 7A showing the variation of the output voltage for a given input voltage, and FIG. 7B showing the variation of the phase, where $\omega = 1/\sqrt{LC}$.

for $R_2 >> R_1 >> \omega L >> R_L$

Then $U \approx O$ $$\frac{d\phi_{1,2}}{dC} \approx \frac{-\omega^3 L^2 R_1}{\omega^2 L^2 + R_1 R_L}$$

The above sensitivity is shown by graphs in FIG. 8 for the parameters shown.

Because of the problems associated with drift an automatic tune control is used. Tuning is accomplished by a feedback voltage circuit, shown in FIG. 9. In this figure, the exciter detector section 20 is shown as a block, except for details of the tuning control circuit 28 having the tuning control input on lead 136. The direct current tuning voltage is shown supplied via a switch 902, which has two points for manual mode and automatic mode. In the manual mode position, the voltage is from the slider of a potentiometer 904 connected between a d.c source +V and ground, and in automatic mode the voltage is from an automatic tune control circuit 900.

Figure 9:
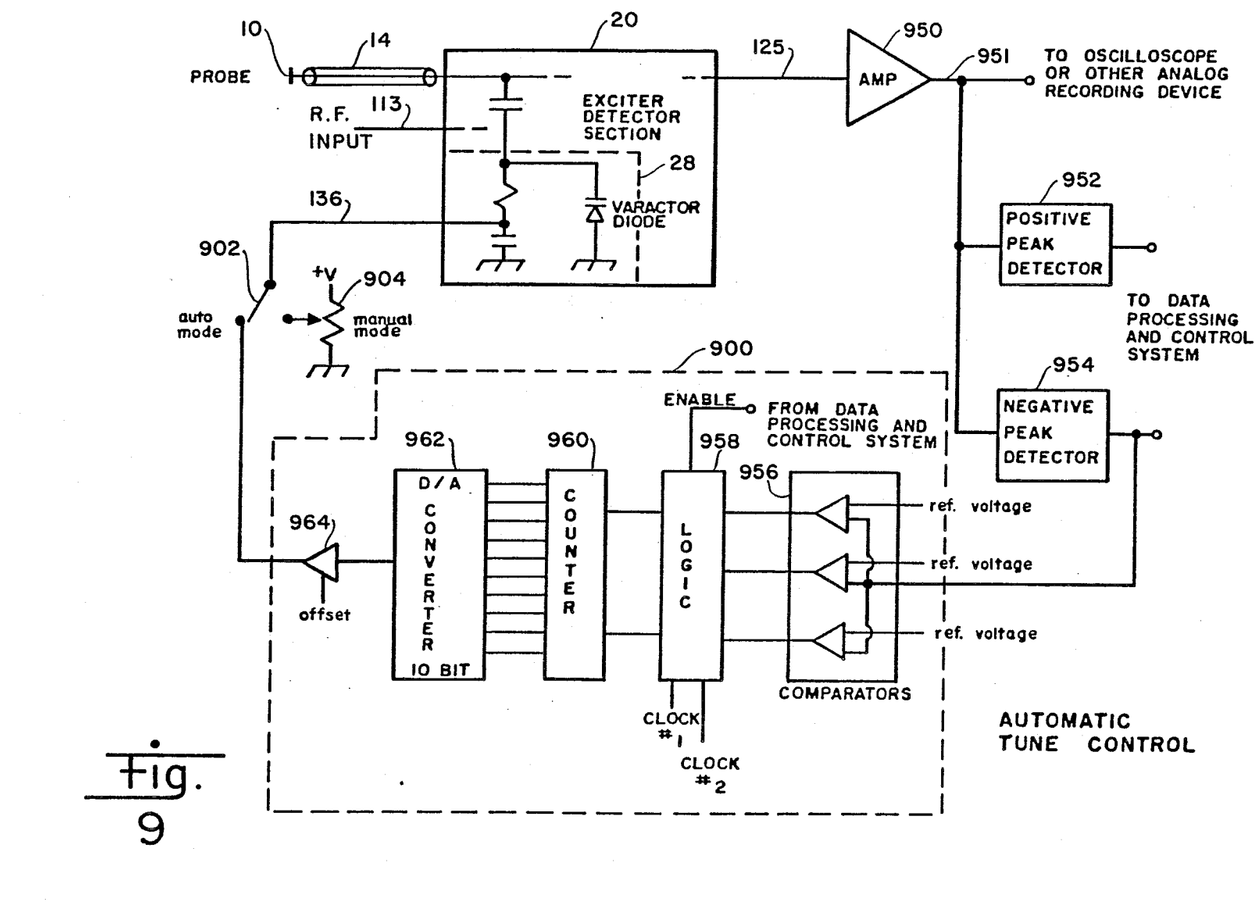
FIG. 9 is a block and schematic diagram of an automatic tune control circuit for the system of FIG. 1.

From the exciter detector section 20, the phase detector output on line 125 is coupled through an amplifier 950 and line 951 to a terminal to an oscilloscope or other analog recording device, with line 951 also connected to the inputs of a positive peak detector 952 and a negative peak detector 954. The outputs of the two peak detectors 952 & 954 have terminals to a data processing and control system. The output of the negative peak detector 954 is also coupled to the automatic tune control circuit 900.

In the automatic tune control circuit 900, the input signal is supplied to three comparators of a unit 956, for comparison to three different reference voltage levels. The outputs of the comparators go to inputs of a logic unit 958, which also has an enable input from the data processing and control system, and inputs for two clock signals #1 and #2. Outputs from the logic unit 958 go to a counter 960, which has output on ten lines to a 10-bit D/A converter 962. The output from the converter 962 is coupled via an operational amplifier 964 to the automatic mode contact terminal of switch 902, the amplifier 964 having an offset input.

For the automatic mode, the negative peak detector 954 discriminates between the baseline and signal. Although analog circuitry could be used for the feedback signal conditioning, a digital technique was chosen. The digital approach allows the feedback voltage to the varactor diode to be held constant while a sensitivity calibration is being done. Since this calibration requires less than 16 seconds, the amount of drift in the baseline due to temperature is not anticipated to be significant.

The sensitivity calibration set-up in circuit 240 of FIG. 2A or FIG. 5 is accomplished via an SPDT relay and a pair of very stable variable air capacitors. One of the capacitors 244 is adjusted to fine tune the cable probe assembly, whereas the second capacitor 246 when selected by the relay at its contacts 242 is adjusted to a predetermined baseline shift as shown in FIG. 2A (lower right) or FIG. 5 (lower right). The varactor control voltage is held at a nominal value during these procedures. The probe to blade calibration must then be done while there is assurance that the sensitivity of the system has not changed. From then on during any test operation, the calibration relay can be energized to operate contacts 242 and the baseline shift noted (feedback to varactor diode held constant when the relay is energized). Any change in baseline value from that taken during bench calibration is used to adjust the data accordingly.

Figure 10A:
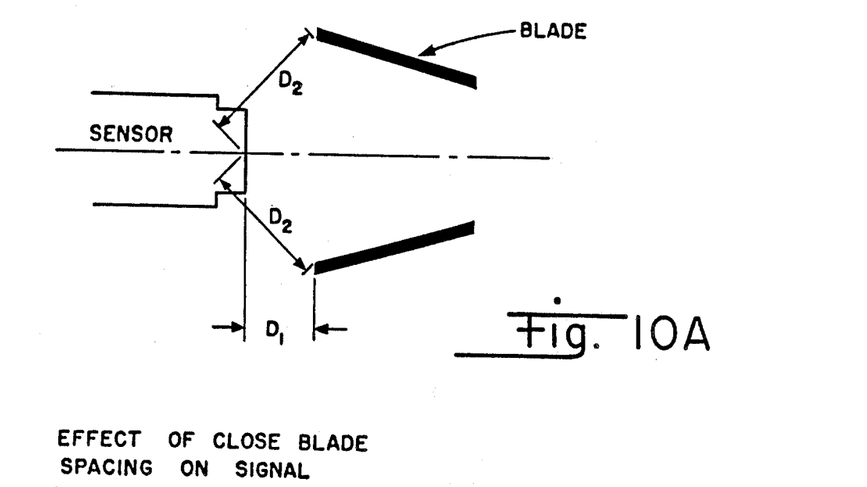
FIGS. 10A, 10B and 10C are symbolic diagrams and a graph for showing the effect of close blade spacing on signal.
Figure 10B:
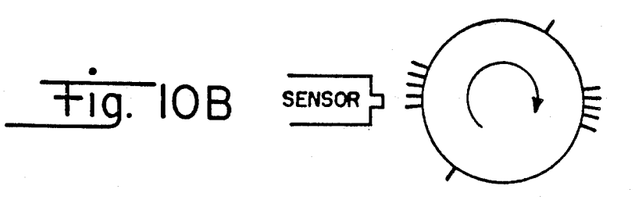
Figure 10C:
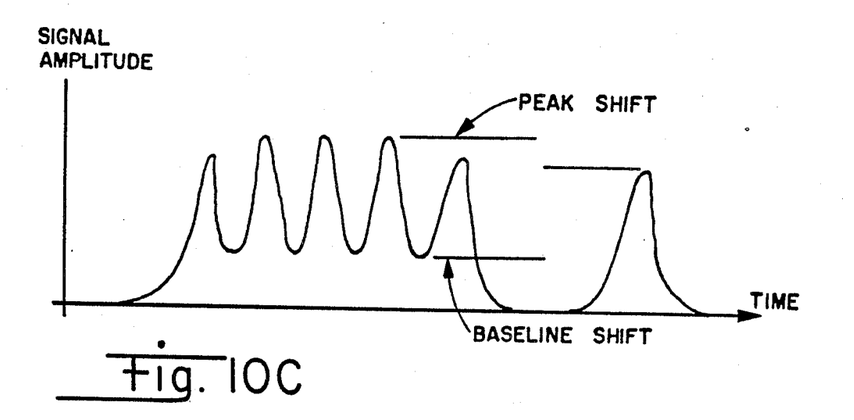
Figure 11:
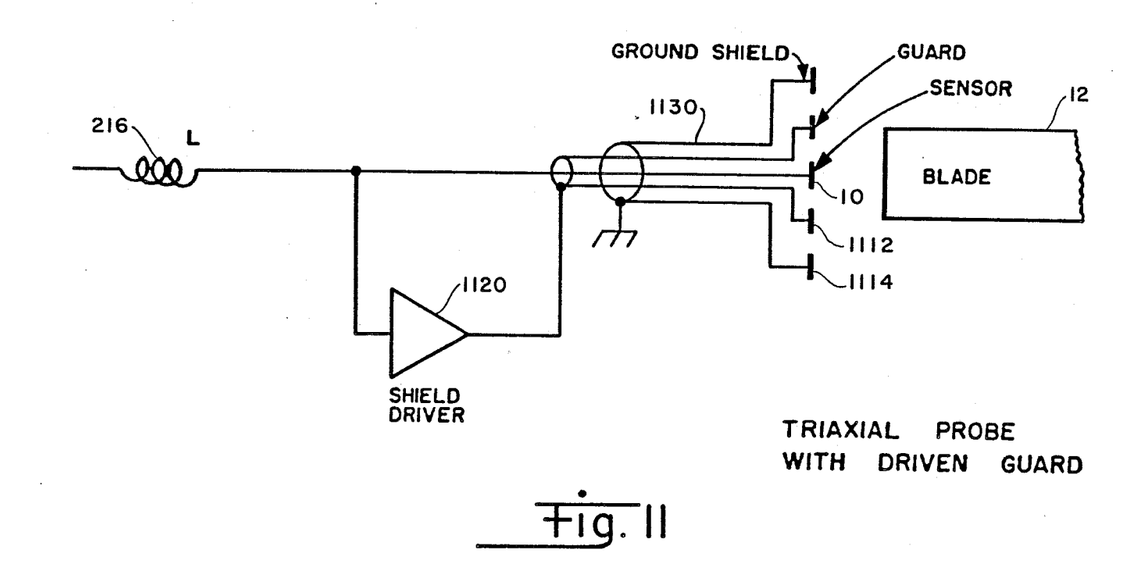
FIG. 11 is a symbolic diagram showing a triaxial probe with driven guard.

Although the techniques described above eliminate some of the problems related to capacitance clearance measurement systems, other problems persist. One major problem of capacitance systems is the electric field fringing effects associated with the sensor probe. The assumption of using the capacitance model of two flat planes is invalid insofar as small probe sensors are concerned. Therefore, physical calibrations rather than analytical predictions must be made. In addition, if the blade tips are closely spaced as in the J85 compressor the actual calibration becomes even more complex as shown in FIGS. 10A, 10B and 10C. The only recourse now is to obtain as much information as possible on bench calibration prior to test. An alternative is to redesign the probe and some of the circuitry in a way to reduce the fringing effects, as shown in FIG. 11. The use of a driven guard 1112 can be used to reduce the fringing effects. Two advantages come about from such a configuration. First, the blade-to-blade spacing is not as critical because of the reduced fringing and second, the apparent total capacitance to the tuned circuit is reduced, thus improving sensitivity significantly. The disadvantage is the requirements placed on the guard driver amplifier 1120 which must drive a higher capacitance load. The capacitance on the guard-to-ground shield on triax cable 1130 is in the order of 120 pf/ft and the capacitance of the probe guard 1112 to a probe ground shield 1114 is anticipated to be in excess of 100 pf depending on design. Obviously, this approach is not a panacea because of added complexity to the circuit and probe design.

Figure 12:
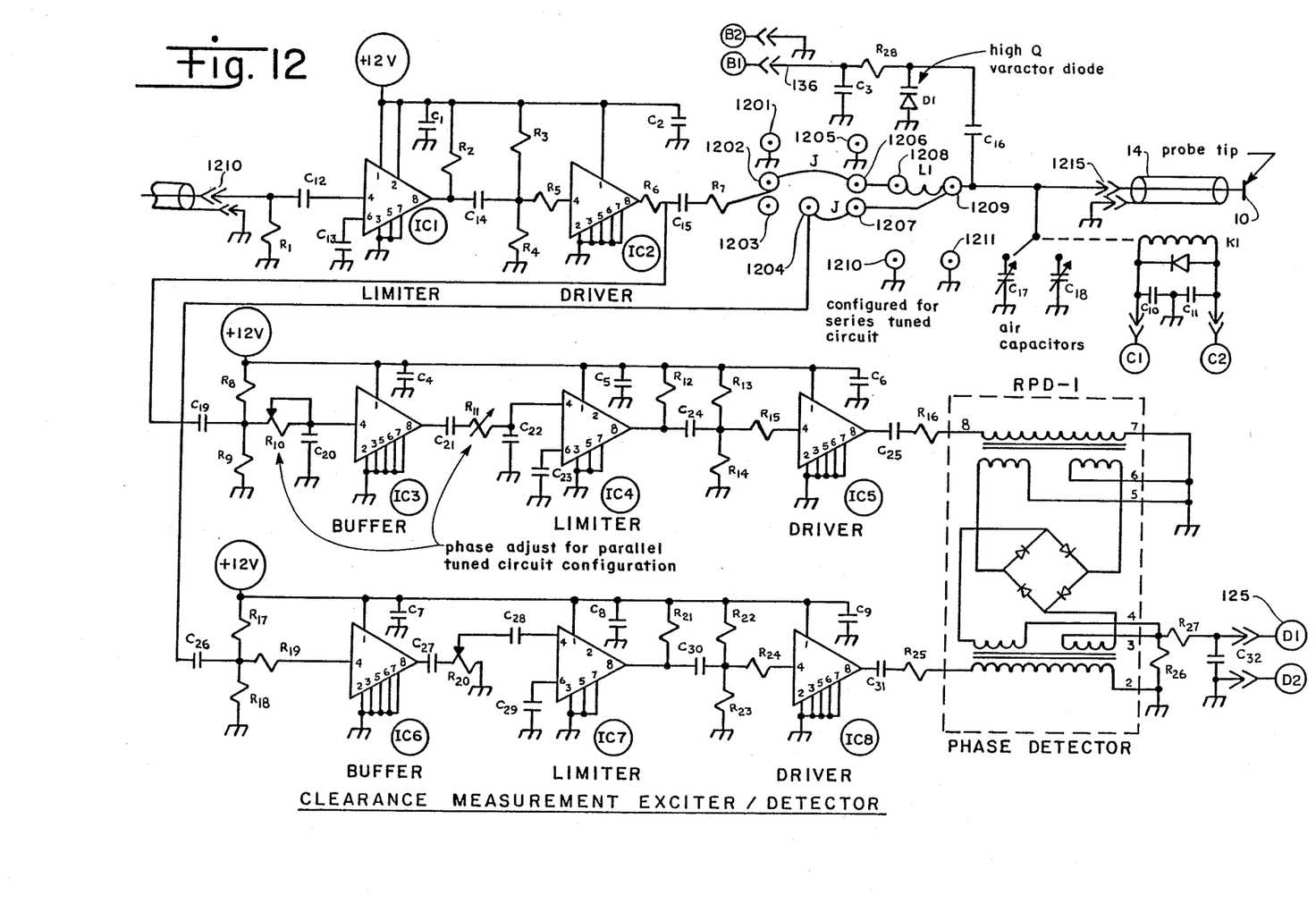
FIG. 12 is a functional block and schematic diagram of a prototype exciter/detector module which may be configured for either of FIGS. 2A or 5.

A prototype exciter/detector circuit 20 and probe assembly as shown in FIG. 12 has been built and tested for verification of all of the concepts described above. The circuit board has a group of plug-in points 1201–1211 to permit it to be configured for either the series tuned circuit of FIG. 2A, or the parallel tuned circuit of FIG. 5, with the series tuned configuration being shown. The board has a coaxial connector 1210 for the R.F. input, which has its center conductor connected via a resistor R1 to ground, and via a capacitor C12 to the input terminal 4 of a limiter amplifer IC1. The output terminal 8 of the amplifier IC1 is coupled via a capacitor C14 and a resistor R5 to the input terminal 4 of a drive amplifier IC2. The amplifiers IC1 and IC2 have bias connections to +12 volts and ground as shown, using capacitors C1, C2 and C13, and resistors R2, R3 and R4. An output terminal 8 of the amplifier IC2 is coupled via a resistor R6, a capacitor C15 and a resistor R7 to the plug in points 1202 and 1203. For the series configuration, point 1202 is connected via a jumper to points 1206 and 1208. The tuning inductor L1 is connected between plug in points 1208 and 1209. Point 1209 is connected to the center conductor of a coaxial connector 1215 for the probe.

The tune control circuit (28 in FIG. 2A or FIG. 5) comprises a high Q varactor diode D1 having its anode grounded and its cathode connected via a resistor R28 to the tuning control lead 136, which is connected to a terminal B1 (having a companion terminal B2 to ground. The cathode of the diode D1 is also coupled via a capacitor C16 to point 1209.

The calibration circuit (26 in FIG. 2A or FIG. 5) has a relay K1 whose contacts normally connect variable capacitor C17 to point 1209, and when operated connects variable capacitor C18 to that point. The winding of the relay is connected to terminals C1 and C2, and is shunted by a diode and by two capacitors C10 and C11 whose junction is grounded.

The first phase detector input amplifier (220 in FIG. 2A or 520 in FIG. 5) comprises a buffer amplifier IC3, a limiter amplifier IC4 and a driver amplifier IC5 in tandem. The input terminal 4 of the amplifier IC3 is coupled via an adjustable resistor R10 and a capacitor C19 to the junction of resistor R6 and capacitor C15. Amplifiers IC3 and IC4 are coupled via a capacitor C21 and an adjustable resistor R11. Amplifiers IC4 and IC5 are coupled via a capacitor C24 and a resistor R15. The output of amplifier IC5 is coupled via a capacitor C25 and a resistor R16 to input terminal 8 of the phase detector 1224. The second phase detector input amplifier (226 in FIG. 2A or 526 in FIG. 5) comprises a buffer amplifier IC6, a limiter amplifier IC7 and a driver amplifier IC8 in tandem. The input terminal 4 of the amplifier IC6 is coupled via a resistor R19 and a capacitor C26 to the plug in point 1204, which for the series configuration is connected via a jumper to plug in point 1207, which in turn is connected to point 1209. Amplifiers IC6 and IC7 are coupled via a capacitor C27, an adjustable resistor R20, and a capacitor C28. Amplifiers IC7 and IC8 are coupled via a capacitor C30 and a resistor R24. The output of amplifier IC8 is coupled via a capacitor C31 and a resistor R25 to input 1 of the phase detector 1224. The amplifiers IC3–IC8 have bias connections to +12 volts and ground as shown, using capacitors C4, C5, C6, C7, C8, C9, C22 and C29, and resistors R8, R12, R13, R17, R18, R21, R22 and R23.

The phase detector 1224 has terminals 2, 5, 6 and 7 grounded. Terminals 3 and 4 are connected via a resistor R27 to the output lead 125 to a terminal D1. Terminal 2 and 3 are connected via a resistor R26. A capacitor C32 connects terminal D1 to a ground terminal D2.

The component values and types for FIG. 12 are shown in Table 1.

The sensitivity measured during the verification process was well within the value predicted analytically; the operation of the varactor diode and the calibration circuits have performed without problems.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

TABLE 1

| PARTS SCHEDULE (FIG. 12) | |
| --- | --- |
| R1, R5, R15, R16, R19, R24, R25 | 47 ohms |
| R2 | 10 ohms |
| R3, R4, R8, R9, R13, R14, R17 R18, R22, R23 | 50K ohms |
| R6, R7 | 5 ohms |
| R10, R11, R20 | 500 ohms CERNET POT BOURNS MODEL 3299 |
| R12, R21 | 1K ohms |
| R26 | 660 ohms |
| R27 | 4K ohms |
| R28 | 200K ohms |
| C1 thru C9 | 0.1 µf CERAMIC |
| C10 thru C15, C19, C21, C23 thru C31 | 0.01 µf CERAMIC |
| C16 | 5 pf ULTRA STABLE CERAMIC |
| C17, C18 | 1-10 pf VARIABLE AIR CAPACITOR ±15 PPM/°C. |
| C32 | 250 pf |
| IC1, IC4, IC7 | MC1350P MOTOROLA |
| IC2, IC3, IC5, IC6, IC8 | HA 5033-5 HARRIS |
| PHASE DETECTOR | RPD-1 MINI CIRCUITS |
| K-1 | RELAY TELEDYNE MODEL 411-5 |
| L1 | COIL FORM 4-6 µh CAMBION #534352406 |
| D1 | VARACTOR DIODE 1N 5471A MOTOROLA |
| ALL RESISTORS ARE CARBON OR METAL FILM | ¼ watt |

What is claimed is:

1. A compressor blade clearance measurement system for measuring the gap between a turbine engine compressor blade tip and a compressor case, the measurement being accomplished while the engine is running, said measurement system comprising a probe and an exciter/detector module, the probe being coupled to the exciter/detector module via a cable to form a cable probe assembly, said probe having a tip used as a capacitor sensor, whereby the component electronics are not part of a probe assembly but are included in the exciter/detector module away from the probe;

wherein the exciter/detector module comprises a tuned circuit coupled between an input point and an output point, the input point being coupled to a high-frequency source for excitation, the output point being coupled via said cable and probe to the probe tip, the tuned circuit being tuned to the high frequency, in which the blade to sensor capacitance provides a phase change in the tuned circuit response, phase detector means coupled to the tuned circuit at said input and output points for detecting said phase change, the phase detector means having an output for a signal, with an output baseline, supplied to processing means to determine the value of said gap;

wherein said exciter/detector module further includes a calibration circuit coupled to said output point for calibrating the system, and a tuning control circuit comprising a high Q varactor diode also coupled to said output point, and wherein the system includes tune control means coupled to the varactor diode via a resistor for supplying an adjustable direct-current bias to maintain the phase detector output baseline at zero, whereby the the instrument can be electronically calibrated, even while the engine is operating;

wherein said calibration circuit comprises first and second variable capacitors, switching means having first and second settings for respectively connecting the first or second capacitor to said output point, the calibration set-up being accomplished with the switching means at its first setting by adjusting the first capacitor to fine tune the cable probe assembly, whereas the second capacitor when selected by operating the switching means to its second setting is adjusted to a predetermined baseline shift, the varactor diode control voltage being held at a nominal value during these procedures, the probe to blade calibration being done while there is assurance that the sensitivity of the system has not changed, so that during any subsequent test operation, the switching means can be operated to its second setting and the baseline shift noted, the varactor diode control voltage being held constant while the switching means is at its second setting, so that any change in baseline value from that taken during calibration may be used to adjust the data accordingly.

2. A measurement system according to claim 1, wherein said tuned circuit is a series tuned circuit having a resistor and inductor in series between said input and output points.

3. A measurement system according to claim 1, wherein said tuned circuit is a parallel tuned circuit having a resistor and inductor in series between said output point and ground, and a resistor between said input and output points.

4. A measurement system according to claim 1, wherein said first and second capacitors of said calibration circuit are very stable variable air capacitors, wherein said processing means includes peak detector means coupled to the output of the phase detector means, and wherein said tune control means includes a feedback voltage circuit having an input coupled to the peak detector means, providing an automatic tune control for counteracting drift.

5. A measurement system according to claim 4, wherein the total capacitance at said output point to ground including the cable capacitance is relatively low, being of the order of 50 pf, and said high frequency is approximately 10 megahertz, which provides for a relatively low sensor impedance of 100 to 400 ohms and high enough to insure adequate response bandwidth.

6. A measurement system according to claim 5, wherein said peak detector means includes a positive peak detector and a negative peak detector, each coupled to the output of the phase detector means, and wherein said feedback voltage circuit input is coupled to the negative peak detector, enable means for controlling the feedback voltage circuit to hold feedback to the varactor diode constant when the switching means is at its second setting.

7. A measurement system according to claim 6, wherein said feedback voltage circuit comprises three comparators connected to the negative peak detector for comparison of the signal therefrom to three different reference voltage levels, a logic unit having inputs coupled to the three comparators, an input from said enable means, and inputs for clock signals, a counter having inputs from the logic unit and output on a plurality of lines to a D/A converter (962), and an output from the D/A converter coupled via said resistor to the varactor diode.

8. A measurement system according to claim 7, wherein said tuned circuit is a series tuned circuit having a resistor and inductor in series between said input and output points.

9. A measurement system according to claim 7, wherein said tuned circuit is a parallel tuned circuit having a resistor and inductor in series between said output point and ground, and a resistor between said input and output points.

* * * * *